S. BRUCELARIE & E. STEFFAN.
REFRIGERATOR DRIP PAN.
APPLICATION FILED MAY 2, 1911.

1,036,181.

Patented Aug. 20, 1912.

WITNESSES

INVENTORS
Simon Brucelarie
Eugene Steffan
BY
ATTORNEYS

UNITED STATES PATENT OFFICE.

SIMON BRUCELARIE AND EUGENE STEFFAN, OF WEST HOBOKEN, NEW JERSEY.

REFRIGERATOR DRIP-PAN.

1,036,181.   Specification of Letters Patent.   Patented Aug. 20, 1912.

Application filed May 2, 1911. Serial No. 624,560.

*To all whom it may concern:*

Be it known that we, SIMON BRUCELARIE and EUGENE STEFFAN, residing at West Hoboken, in the county of Hudson and State of New Jersey, have invented certain new and useful Improvements in Refrigerator Drip-Pans, of which the following is a specification.

This invention relates to apparatus intended for use as a refrigerating drip pan, or the like, and one of the objects of the invention is to provide such an apparatus which is readily attachable and detachable to and from a drain pipe.

Another object of the invention is to provide an apparatus of the kind described which is removably connected to a drain pipe in such manner that its relations to the pipe are adjustably fixed and maintained.

Other objects and aims of the invention, more or less broad than those stated above, together with the advantages inherent, will be in part obvious and in part specifically adverted to in the following description of the elements, combinations, and arrangement of parts in applications of principles constituting the invention; and the scope of protection contemplated will appear in the claim.

Figure 1:
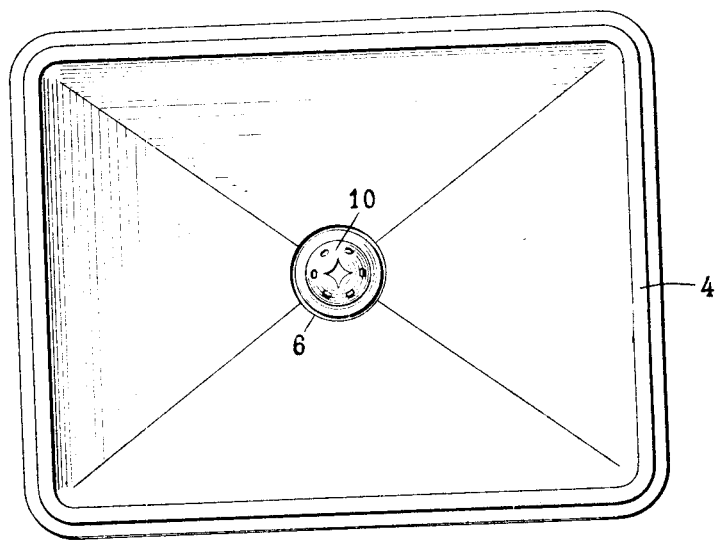
Figure 2:
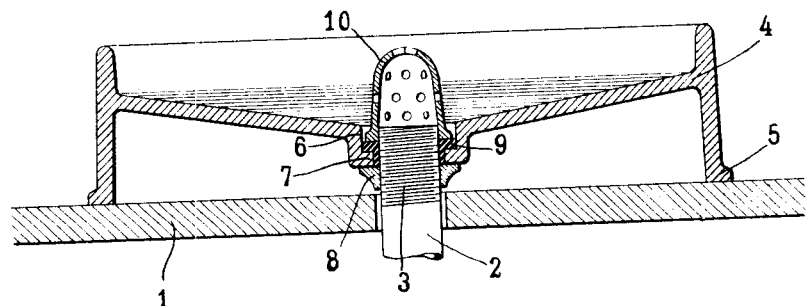
Figure 3:
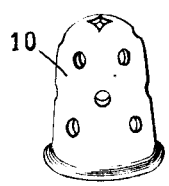

In the accompanying drawings, which are to be taken as a part of this specification, and in which we have shown a merely preferred form of embodiment of our invention; Figure 1 is a top plan view of a device illustrating the invention; Fig. 2 is a central sectional view; and Fig. 3 is a detailed perspective of one of the parts.

Referring to the numerals on the drawings, 1 indicates a floor or other support, through which projects a drain pipe 2 that is exteriorly screw threaded at its end as indicated at 3.

4 indicates a drip pan or vessel, preferably of the general shape shown, and adapted to have its edges 5 rest upon the floor, so that access may be had beneath the pan when it is resting upon the support. The bottom of this drip pan preferably comprises a plurality of sections, all of which angle downward toward the center of the pan, so that any drip into the side portions of the pan will be discharged toward the center by gravity. At the center of the pan there is an abrupt depression defined by a downwardly extending flange 6 whose lower end is provided with an inwardly directed shoulder 7 that partially closes the central aperture of the pan, through which extends the end of the pipe 2. A nut 8 is threaded upon the end of the pipe 2, and this nut is intended to be adjusted to position as shown in Fig. 2, wherein the bottom of the pan rests upon the floor 1, and the pan is also supported centrally upon the nut. An annular gasket 9 is provided, L-shaped in cross section, one arm of said L resting upon the shoulder 7 of the pan, and the other occupying the space between the inner end of said shoulder and the pipe 2.

10 indicates a strainer, which preferably takes the form of a perforated thimble, interiorly screw threaded to engage the threaded end of the pipe 2, so that upon manipulation of the strainer the gasket 9 may be compressed to effectually seal the joint between the bottom of the pan 1 and the pipe 2. As shown in the drawings, the top of the strainer is also perforated and the parts are arranged so that the top of the strainer is below the plane of the top of the pan. This is in order that in case the side perforations of the strainer should become clogged, the water would not at once overflow, but might escape through the top of the strainer.

The use of the device may now be understood: The pipe being in place, the lock nut 8 is screwed on to the end of the pipe until it reaches such position that it will support the central depressed part of the pan, while the outer portions thereof are supported upon the floor. The pan being in place as shown in Fig. 2, the gasket 9 is positioned as in Fig. 2, and then the strainer 10 is screwed down upon the end of the pipe 2 in order to compress the gasket 9 between it and the nut 8 and between the inner end of the shoulder 7 and the pipe 2. A tight joint is thus made and all without the use of any tools at all. At the same time the apparatus is easily disassembled for repairs or the like; and furthermore in case, for instance, of warping of the floor or support 1, and the consequent withdrawal of support from the outer edges of the pan, the pan will nevertheless be held to its position relatively to the pipe, because its central portion rests upon the nut 8 and is rigidly clamped against the same by means of the strainer 10. Consequently, the pan is held immovable with respect to the pipe, notwithstanding any irregularity in the supporting surface 1.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense. It is also to be understood that the language used in the following claim is intended to cover all of the generic and specific features of the invention herein described and all statements of the scope of the invention, which as a matter of language, might be said to fall therebetween.

Having thus described our invention, what we claim as new and desire to secure by Letters Patent, is:

A drip pan having its bottom wall provided centrally with a downwardly extending annular projection which forms a similarly shaped depression interiorly of said pan, the said projection having an inwardly extending portion formed into a ledge which defines a central aperture, a drain pipe having a diameter less than that of said aperture and extending freely therethrough, there being a threaded portion upon the end of said pipe, a portion of which threaded portion extends upon either side of said ledge, a nut threaded upon said pipe below the pan and engaging the bottom of the ledge, a gasket resting upon said ledge and surrounding said pipe, and an apertured strainer threaded upon the end of the pipe to compress the gasket between said strainer, said nut and said ledge.

In testimony whereof we have affixed our signatures in the presence of two witnesses.

SIMON BRUCELARIE.
EUGENE STEFFAN.

Witnesses:
FRANK J. KENT,
A. S. HONIGSBERG.